US006992979B2

(12) United States Patent
Hauser et al.

(10) Patent No.: US 6,992,979 B2
(45) Date of Patent: Jan. 31, 2006

(54) MAINTAINING INFORMATION TO OPTIMIZE RESTORABLE DYNAMIC ROUTING WITH SHARED BACKUP

(75) Inventors: Oded Hauser, Matawan, NJ (US); Muralidharan Sampath Kodialam, Marlboro, NJ (US); Tirunell V. Lakshman, Morganville, NJ (US); Wing Cheong Lau, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 902 days.

(21) Appl. No.: 09/894,946

(22) Filed: Jun. 28, 2001

(65) Prior Publication Data

US 2002/0105904 A1    Aug. 8, 2002

Related U.S. Application Data

(60) Provisional application No. 60/266,973, filed on Feb. 7, 2001.

(51) Int. Cl.
*H04L 12/26* (2006.01)
(52) U.S. Cl. .................................. 370/228; 370/227
(58) Field of Classification Search ................ 370/217, 370/227, 241, 242, 244, 245, 250, 228, 236; 714/1, 2, 3
See application file for complete search history.

(56) References Cited

U.S. PATENT DOCUMENTS

| | | | | |
|---|---|---|---|---|
| 4,775,976 A | * | 10/1988 | Yokoyama | ...................... 714/4 |
| 5,187,706 A | * | 2/1993 | Frankel et al. | ............... 370/217 |
| 6,021,113 A | * | 2/2000 | Doshi et al. | ................. 370/228 |
| 6,539,425 B1 | * | 3/2003 | Stevens et al. | ............. 709/220 |
| 6,801,534 B1 | * | 10/2004 | Arrowood et al. | .......... 370/400 |
| 6,829,215 B2 | * | 12/2004 | Tornar | ........................ 370/223 |
| 6,850,705 B2 | * | 2/2005 | Su et al. | ........................ 398/5 |

OTHER PUBLICATIONS

Kini, S., Lakshamn, T.V . Kodialiam, M. S. and Villamizar, C., Shared backup Label Switched path restoration: draft-kini-restoration-shared-backup-oo.txt, Nov. 2000.
Kini, S., Lakshamn, T. V. Kodialiam, M. S. and Villamizar, C., ReSerVation Protocol with Traffic Engineering extensions, Extension for label Switched Path restoration, draft-kini-rsvp-lsp-restoration-00.txt, Nov. 2000.
Kini, S., Lakshamn, T. V. Kodialiam, M. S. and Villamizar, C., "Intermediate System to Intermediate System (IS-IS) protocol extensions for Label Switched Path restoration," draft-kini-isis-isp-restoration-00.txt, Nov. 2000.
Kini, S., Lakshamn, T. V. Kodialiam, M. S. and Villamizar, C., Open Shortest Path First (OSPF) protocol extensions for Label Switched Path restoration, draft-kini-ospf-Isp-restoration-00.txt, Nov. 2000.
Kini, S., Lakshamn, T. V. Kodialiam, M. S. Dynamic Routing of Bandwidth Guaranteed Tunnels with Restoration, Proceeding of INFOCOM 2000.

* cited by examiner

*Primary Examiner*—Ajit Patel
*Assistant Examiner*—Andrew C. Lee

(57) ABSTRACT

A network element maintains failure information for a packet-based network and usage information for a backup path. Upon receipt of a new demand, with an associated bandwidth, d, the network element determines if the backup path can be shared as a function of the failure information and the usage information associated with the backup path.

6 Claims, 5 Drawing Sheets

MAINTAINING INFORMATION TO OPTIMIZE RESTORABLE DYNAMIC ROUTING WITH SHARED BACKUP

CROSS-REFERENCE TO RELATED APPLICATIONS

This application claims the benefit of U.S. Provisional Application No. 60/266,973, filed Feb. 7, 2001.

FIELD OF THE INVENTION

This invention relates generally to communications and, more particularly, to packet communications systems.

BACKGROUND OF THE INVENTION

A packet-based communications network can be viewed as comprising a number of nodes. (As used herein, a "node" refers to any equipment for communicating packets, e.g., a network element, a router, etc.). In such a network, dynamic routing is essential for on-request provisioning of network bandwidth. For the dynamic routing considered here, demands (for set-up of bandwidth guaranteed paths) are not known ahead of time and arrive to the network one at a time. Each demand has associated with it a source node, a destination node and the bandwidth d needed for the demand. (The source and destination nodes are the ingress and egress nodes of the network for a particular demand.)

When a demand arrives into the network, dynamic routing sets up at least two paths: an active (primary) path and a backup path (such algorithms are known in the art and art not described herein). Each path specifies a sequence of links traversing the network from the source node to the destination node. (As used herein, a "link" is any connection between two nodes, e.g., wired, optical, wireless, etc.) Each link on the primary path reserves the associated bandwidth of d units for processing the demand. If the active path fails, traffic is diverted to the backup path (hence providing restorability).

SUMMARY OF THE INVENTION

As noted above, the backup path protects the primary path against a predetermined set of failures, where each failure is specified by a set of links that may fail simultaneously. However, in such a dynamic environment bandwidth efficiencies can be achieved by providing for the sharing of backup paths. This is possible because, by assumption, the failure scenarios against which restorability is to be maintained are known. Therefore, it is possible to determine whether two given links, or nodes, can fail at the same time. If they cannot fail at the same time, backup bandwidth for these elements is shareable. Since bandwidth can be shared along the backup links, the amount of bandwidth reservation to be done on each link in the backup path must be determined.

In accordance with the invention, a network element, of a packet-based network, stores failure information associated with the packet-based network and usage information for a backup resource, and, upon receipt of a new demand, determines if the backup resource is shareable as a function of the failure information and the usage information. As a result, accurate backup resource reservation with sharing of backup resources is possible.

In an embodiment of the invention, the illustrative backup resource is a backup path. A network element maintains failure information for a packet-based network and usage information for the backup path. Upon receipt of a new demand, with an associated bandwidth, d, the network element determines if the backup path can be shared as a function of the failure information and the usage information associated with the backup path.

DETAILED DESCRIPTION

Figure 1:
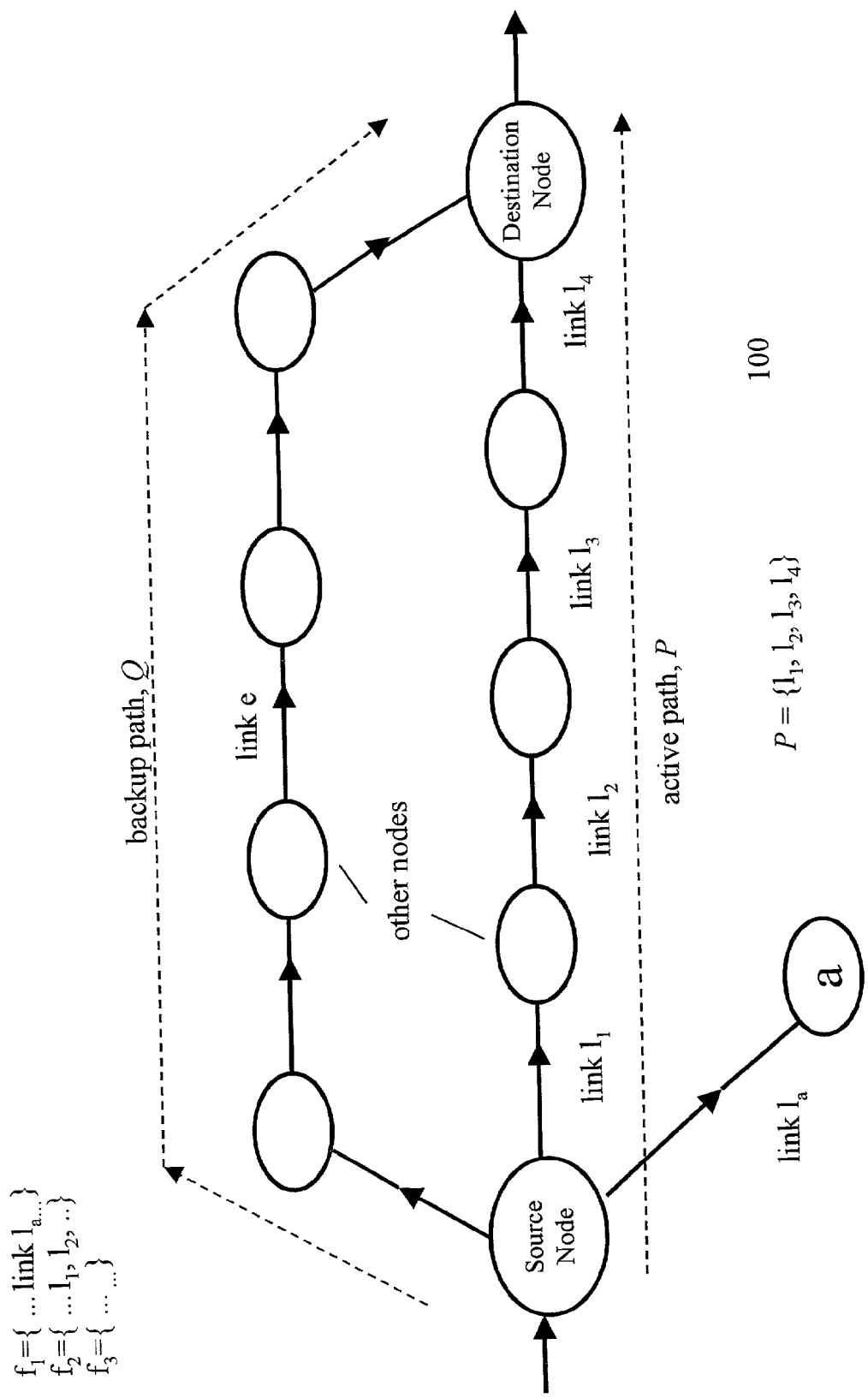
FIG. 1 shows an illustrative packet-based network incorporating the principles of the invention.

A portion 100 of an illustrative packet-based network, in accordance with the principles of the invention, is shown in FIG. 1. Other than the inventive concept, the elements shown in FIG. 1 are well known and will not be described in detail. For example, although shown as a single node, the source node includes stored-program-control processors, memory, and appropriate interface cards. Portion 100 includes a plurality of nodes coupled via communications links (or facilities) (e.g. optical fibers), as represented by links $l_1$, $l_2$, etc. With respect to illustrating the inventive concept, only one primary path and one backup path are shown in portion 100. However, it should be noted that since FIG. 1 only shows a portion of the network, other nodes (represented, e.g., by node "a" of FIG. 1) exist for providing various primary paths and backup paths for different demands. The inventive concept is implemented using conventional programming techniques, which as such, will not be described herein.

For the purposes of the description below, it is assumed that information (described below) is stored on links in the network. However, it should be noted that in reality, all such link information is typically stored at one of the nodes that the link is connected to and all the bandwidth reservations on this link are performed by that node.

In accordance with the invention, determining whether a backup resource can be shared is a function of failure information and usage information, both of which are maintained at each link in the network. As described below, bandwidth on the backup path is used as an illustration of a backup resource.

With respect to failure information, let F be the set of failures. Recall that each failure is specified by a set of links that fail simultaneously. This can be thought of as a shared risk group (SRLG). Let $L_f$ represent the set of links that fail when failure f∈F occurs. The set of failures F and the lists $L_f$ for each f∈F is the same at all links in the network and is known to all links in the network. Illustrative failures, $f_1$, $f_2$ and $f_3$ are shown in FIG. 1. Although, the associated set of links for $f_1$, $f_2$ and $f_3$ are illustrated as comprising more than one link, it may be the case that only single link failures occur. In this situation, the set of failures F is simply failures $f_1$ through $f_n$ where n is the number of links in the network and the corresponding set of links for each failure, f, is one link, i.e., $L_f$ for a given link failure is just the link itself. It is assumed that failure information is determined a priori (using any number of known techniques) and communicated to various links (nodes) of the network via known signaling techniques (e.g., use of, or straightforward modification of, the known RSVP protocol).

Turning now to usage information, this is different for each link. Consider a representative link e shown in portion 100 of FIG. 1. At this link, associated with each failure f∈F is the quantity $D_f^e$, which is the amount of bandwidth that occurs on link e when failure f occurs. (Obviously, if a demand is not re-routed over link e when the failure f occurs then, for that particular failure, $D_f^e=0$.) Therefore, the amount of bandwidth to reserve on link e to guard against the worst failure is defined as:

$B_e$=backup bandwidth reservation on a link $e$; where $$B_e = \max_{f \in F} D_f^e. \quad (1)$$

As used herein, the usage information comprises $D_f^e$ and $B_e$. Each link maintains its current usage information.

Figure 2:
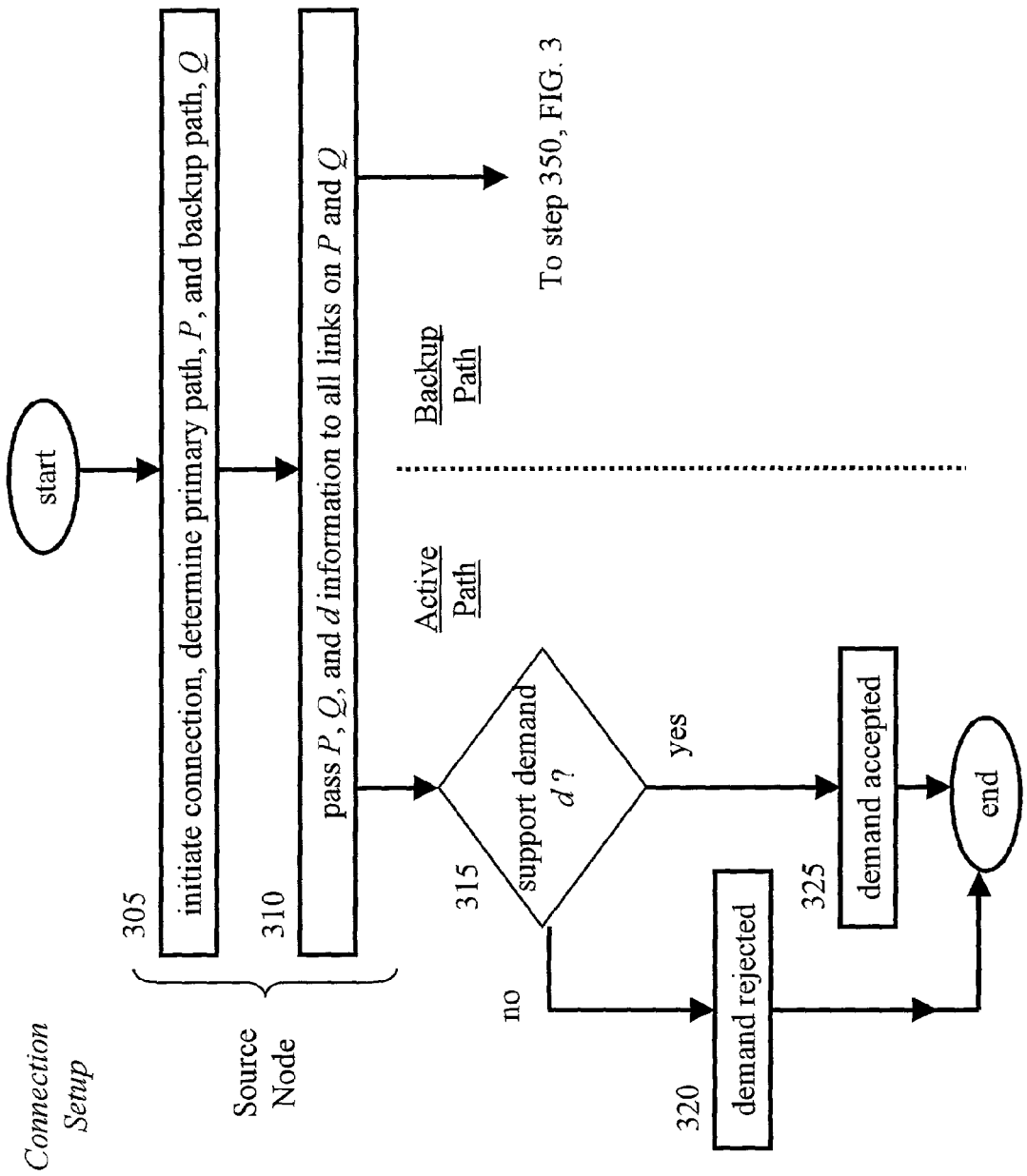
FIGS. 2, 3 and 4 show illustrative flow charts in accordance with the principles of the invention.

Turning now to FIG. 2, an illustrative flow chart is shown in accordance with the principles of the invention for determining if a backup path can be shared. In accordance with the invention, usage information for each link is updated dynamically when demands arrive and leave the network. Initially the values of $D_f^e$ and $B_e$ are set to zero for all e and f. In step 305, a connection is initiated, i.e., a demand arrives at a source node of the network, e.g., the source node shown in FIG. 1. As noted above, each demand has an associated bandwidth, d, needed for the demand. The source node performs dynamic routing and provisionally sets up at least two paths: an active (primary) path and a backup path in step 305 (such algorithms are known in the art and art not described herein). An illustrative primary path, P, and backup path, Q, are shown in FIG. 1. Both P and Q are link sets. For example, P comprises the link set {$l_1$, $l_2$, $l_3$, $l_4$} as shown in FIG. 1. When the demand is routed through the network it is assumed, in step 310, that the routing protocol (e.g., RSVP) passes along to all links in the active path and the backup path the following information:

the active path P (i.e., the link set);
the backup path, Q (i.e., the link set); and
the demand value, d.

Links not on the active path or the backup path do not receive this information. As such, links not on the active path or the backup path are not involved in the steps described below.

A link on the active path performs steps 315, 320 and 325, as shown in FIG. 1. If any link along the active path cannot make a reservation of d units (step 315), then the demand is rejected (steps 315, 320) and the source node must determine different routing. On the other hand, if a link can support the demand, d, then the demand is accepted (steps 315, 325).

Figure 3:
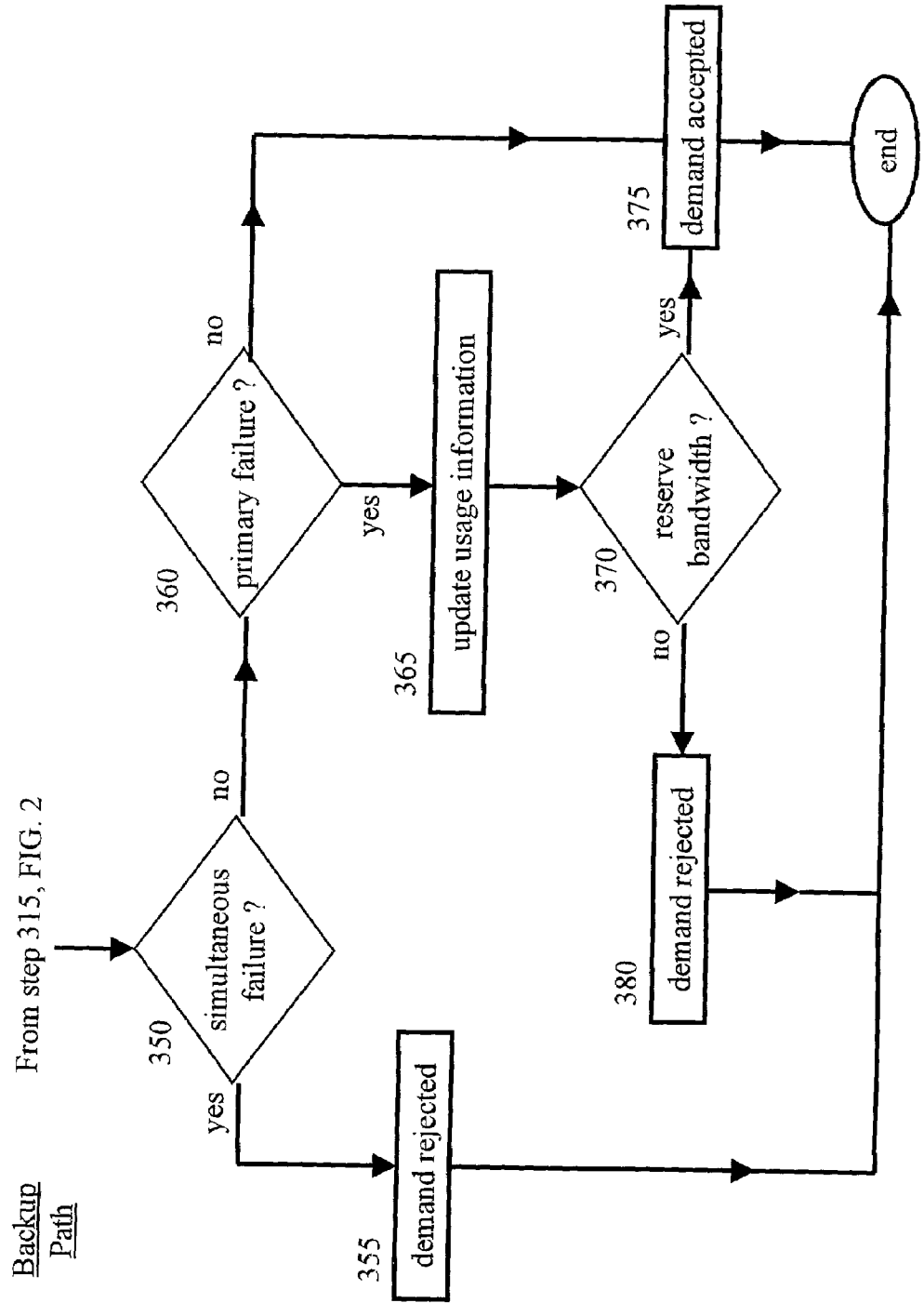

With respect to the backup path, each link e∈Q performs steps 350 through 380, shown in FIG. 3. In step 350, each link on the backup path checks if the primary path and the backup path can fail simultaneously. For this, each link on the backup path accesses the above-mentioned failure information (stored at each link). In particular, for each f∈F, a link computes $L_f \cap P \cap \{e\}$. If $L_f \cap P \cap \{e\} \neq \emptyset$ for some f∈F, then the demand is rejected (in step 355) since the primary path and the backup path can fail simultaneously. On the other hand, if the primary path and the backup path cannot fail simultaneously, then each link on the backup path checks if the primary path can fail in step 360. In particular, for each f∈F, a link computes $L_f \cap P$. If the primary path does not fail, no updating is necessary, and the demand may be accepted in step 385. However, if the primary path can fail, i.e., if $L_f \cap P \neq \emptyset$, then the respective usage information for that link is updated in step 365. In particular, each link in the backup path computes $D_f^e = D_f^e + d$, and computes the new backup reservation, $B_e$, i.e., $B_e = \max_{f \in F} D_f^e$. In step 370, each link on the backup path checks to see if the new backup reservation amount, $B_e$, can be reserved (i.e., does link e have the bandwidth available). If the new backup reservation amount, $B_e$, cannot be reserved, then the demand is rejected in step 380 (and the values of the usage information—changed in step 365—are returned to their previous values). Similar to rejections of the demand on the primary path, any rejections on the backup path require the source node to re-compute alternative routes. Otherwise, the demand is accepted in step 375 and the backup path can be shared in accordance with the principles of the invention.

There are some modifications that can be done to the above-described steps in order to improve the efficiency of the algorithm. In particular, since the source node knows the list $L_f$ as well as the primary path and the backup path, the source node can also perform the computations in step 350. Consequently, each link in Q does not have to do this computation. Also, since the source node knows the sets $L_f$ and P, the source node can compute the set $F_1F$ such that $L_f \cap P \neq \emptyset$ if and only if f∈$F_1$. These represent the set of failures that affect the primary path. The source node can pass this set $F_1$ to all links in the backup path saving these other nodes the need to perform the computations in step 360.

Figure 4:
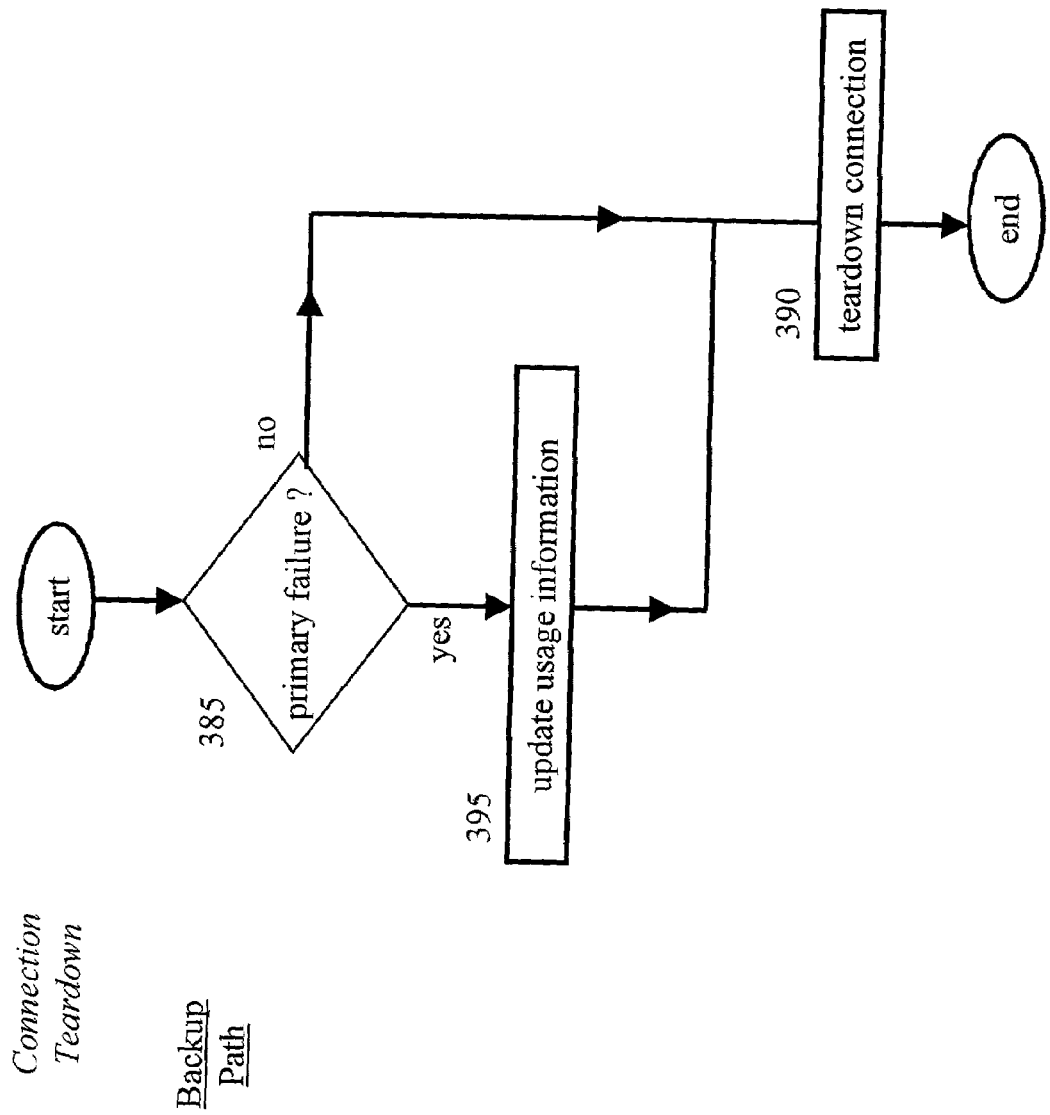

Turning now to FIG. 4, an illustrative flow is shown for updating usage information for a connection teardown, i.e., when a demand leaves the network. It is assumed that during a connection teardown the relevant protocol passes the same information as the connection set up both along the active path and the backup path. In step 385, each link on the backup path checks if the primary path can fail. In particular, for each f∈F, a link computes $L_f \cap P$. If the primary path does not fail, no updating is necessary, and the connection is taken down step 390. However, if the primary path can fail, i.e., if $L_f \cap P \neq \emptyset$, then the respective usage information for that link is updated in step 395. In particular, for each f∈F, each link in the backup path computes $L_f \cap P$. If $L_f \cap P \neq \emptyset$, each link sets $D_f^e = D_f^e - d$ and computes a new backup reservation: $B_e = \max_{f \in F} D_f^e$. The connection is then taken down in step 390. It should be noted that, like the process described above for connection setup, during connection teardown, similar computations can be performed by the source node to improve the efficiency of the process.

Figure 5:
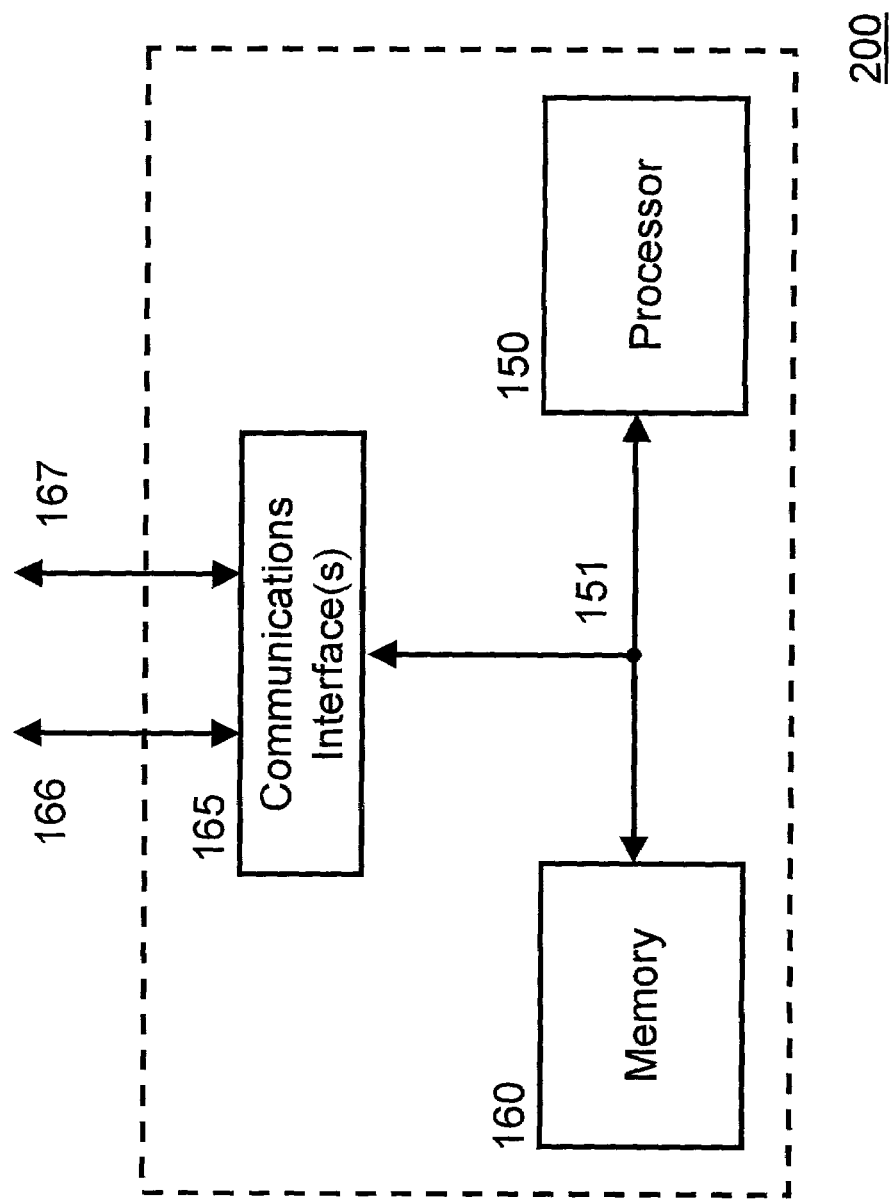
FIG. 5 shows an illustrative high-level block diagram of a node for use in accordance with the principles of the invention.

Turning briefly to FIG. 5, an illustrative architecture for a node is shown. Other than the inventive concept, the elements shown in FIG. 5 are well known and will not be described in detail. Node 200 is a stored-program-control based processor architecture and includes processor 150, memory 160 (for storing program instructions and data (such as the failure information and the usage information)) and communications interface(s) 165 for coupling to one or more links as represented by paths 166 and 167. In the context of this invention, e.g., processor 150 and memory 160 implement (among other functions not described herein) the illustrative flow charts shown in FIGS. 2, 3 and 4.

As described above, and in accordance with the invention, storing the above-described information in network elements and performing the above-described processing permits the sharing of backup resources in packet-based communications networks where each demand has at least a primary path and a backup path. It should be noted that, unlike traditional network design problems, the problem of how to share backup resources is dynamic in nature. Although the inventive concept was illustrated in the context of sharing a backup resource such as a backup path, the inventive concept also applies to other types of resources, e.g., wavelengths or optical interfaces in optical networks. In these more general cases, a failure is represented by a set of resources that fails simultaneously. The main addition to the updating mechanism will be that instead of passing along the primary path P, the resources used by the primary path have to be passed to the backup path. The rest of the computations are along the lines outlined above.

The foregoing merely illustrates the principles of the invention and it will thus be appreciated that those skilled in the art will be able to devise numerous alternative arrangements which, although not explicitly described herein, embody the principles of the invention and are within its spirit and scope.

What is claimed:

1. A method for use in a network element of a packet-based network, the method comprising the steps of:
    storing failure information associated with the packet-based network and usage information for a backup resource;
    upon receipt of a new demand, determining if the backup resource is shareable as a function of the failure information and the usage information;
    wherein:
        the failure information is associated with links of the packet-based network;
        the backup resource is a backup path;
        the usage information is related to a bandwidth associated with the backup path;
        the new demand has an associated bandwidth, d; and
        the determining step includes the steps of:
            determining, from the failure information, if a simultaneous failure can occur on the backup path and a primary path; and
            if no simultaneous failure can occur, updating usage information for the backup path as a function of the bandwidth d associated with the new demand.

2. The method of claim 1 wherein the updating step includes the step of determining, from the updated usage information, if the backup path can support the new demand such that if the new demand cannot be supported the new demand is rejected.

3. A network element for use in a packet-based network, the network element comprising:
    a memory for storing failure information associated with the packet-based network and usage information for a backup resource; and
    a processor, responsive to receipt of a new demand, for determining if the backup resource is shareable as a function of the failure information and the usage information;
    wherein:
        the failure information is associated with links of the packet-based network;
        the backup resource is a backup path;
        the usage information is related to a bandwidth associated with the backup path;
        the new demand has an associated bandwidth, d; and
        the processor determines if the backup resource is shareable by:
            determining, from the failure information, if a simultaneous failure can occur on the backup path and a primary path; and
            if no simultaneous failure can occur, updating the usage information for the backup path as a function of the bandwidth d associated with the new demand.

4. The network element of claim 3 wherein as part of the updating of the usage information, the processor determines, from the updated usage information, if the backup path can support the new demand such that if the new demand cannot be supported the processor causes the new demand to be rejected.

5. A network element for use in a packet-based network, the network element comprising:
    a memory for storing failure information associated with a number of links of the packet-based network;
    a communications interface for coupling to a link that is a part of a backup path; and
    a processor, responsive to receipt of a new demand, for determining if the backup path is shareable with the new demand as a function of the failure information and usage information associated with the backup path;
    wherein the processor rejects the new demand if the backup path and a primary path associated with the new demand are determined to be capable of failing simultaneously from the failure information.

6. The network element of claim 5 wherein the processor rejects the new demand if the backup path cannot support the new demand based upon the usage information.

* * * * *